UNITED STATES PATENT OFFICE.

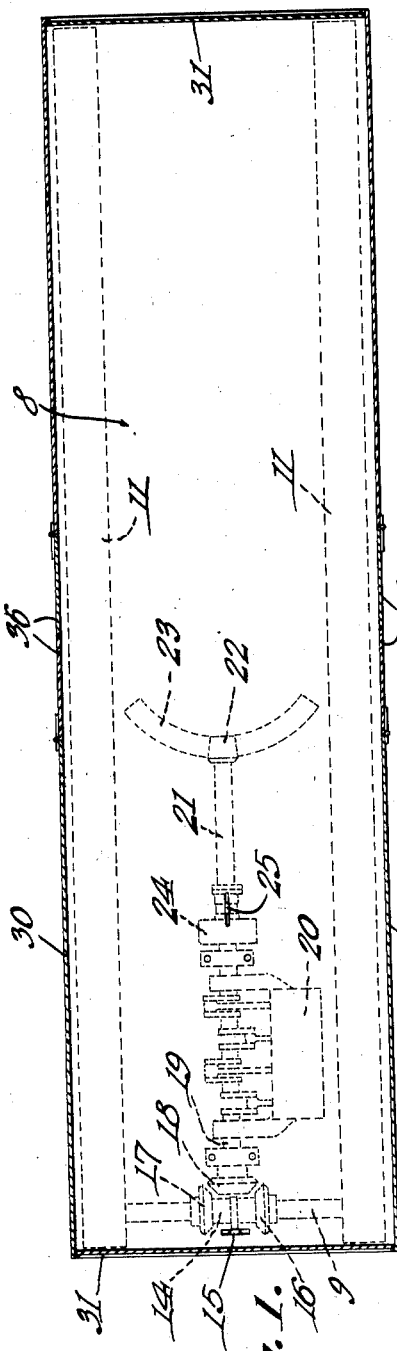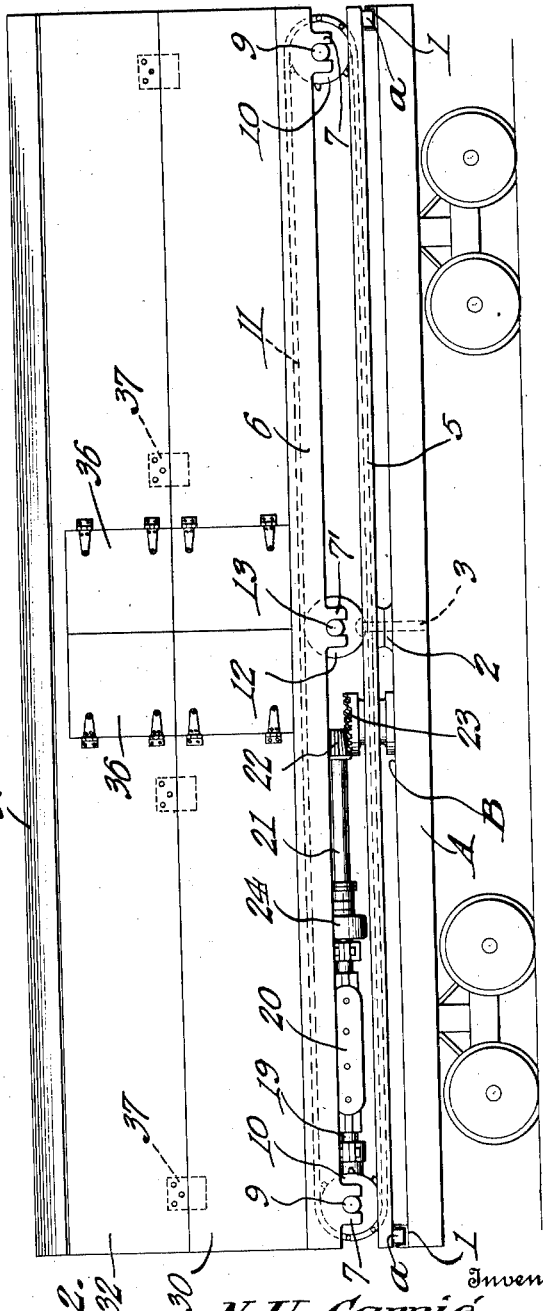

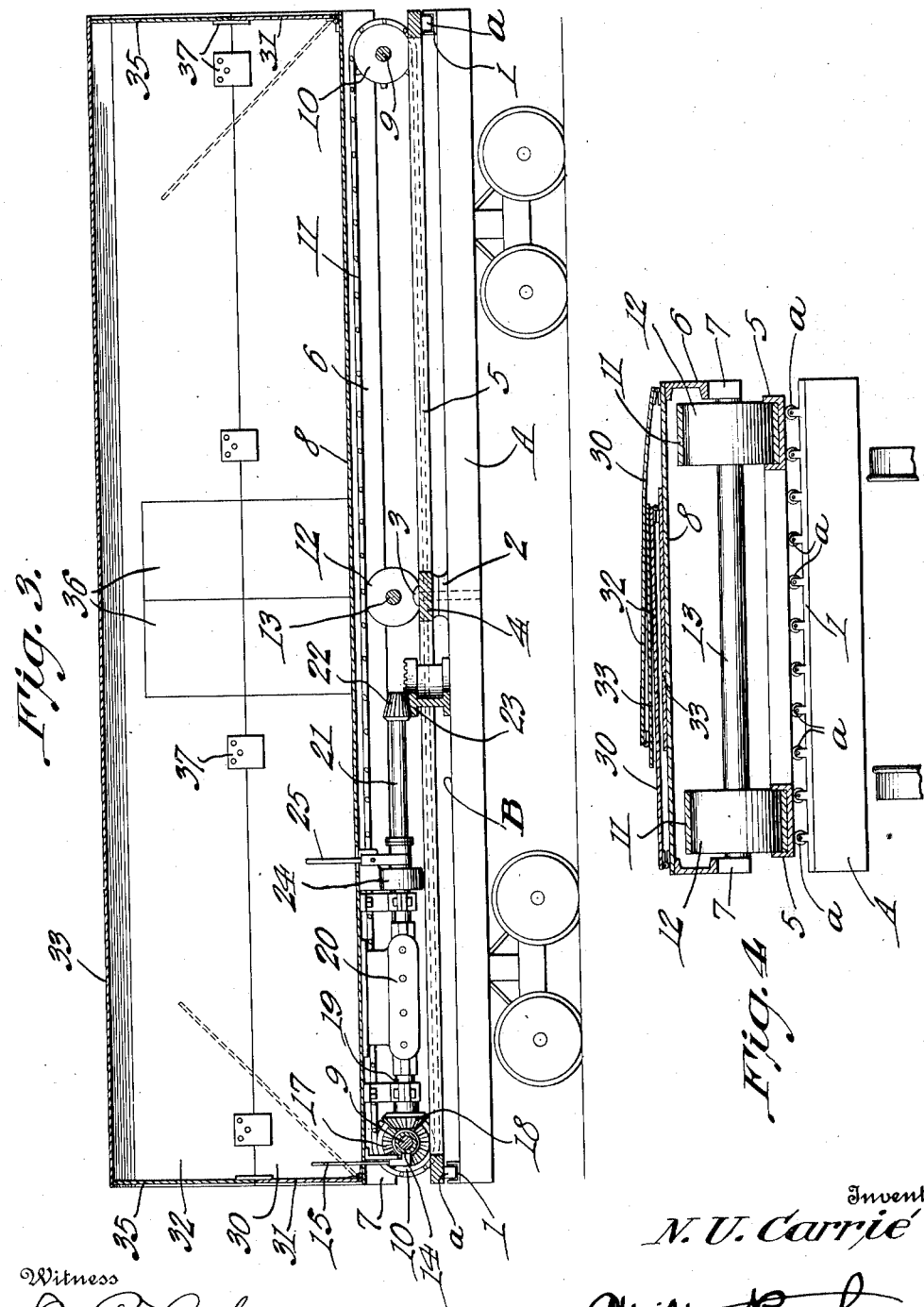

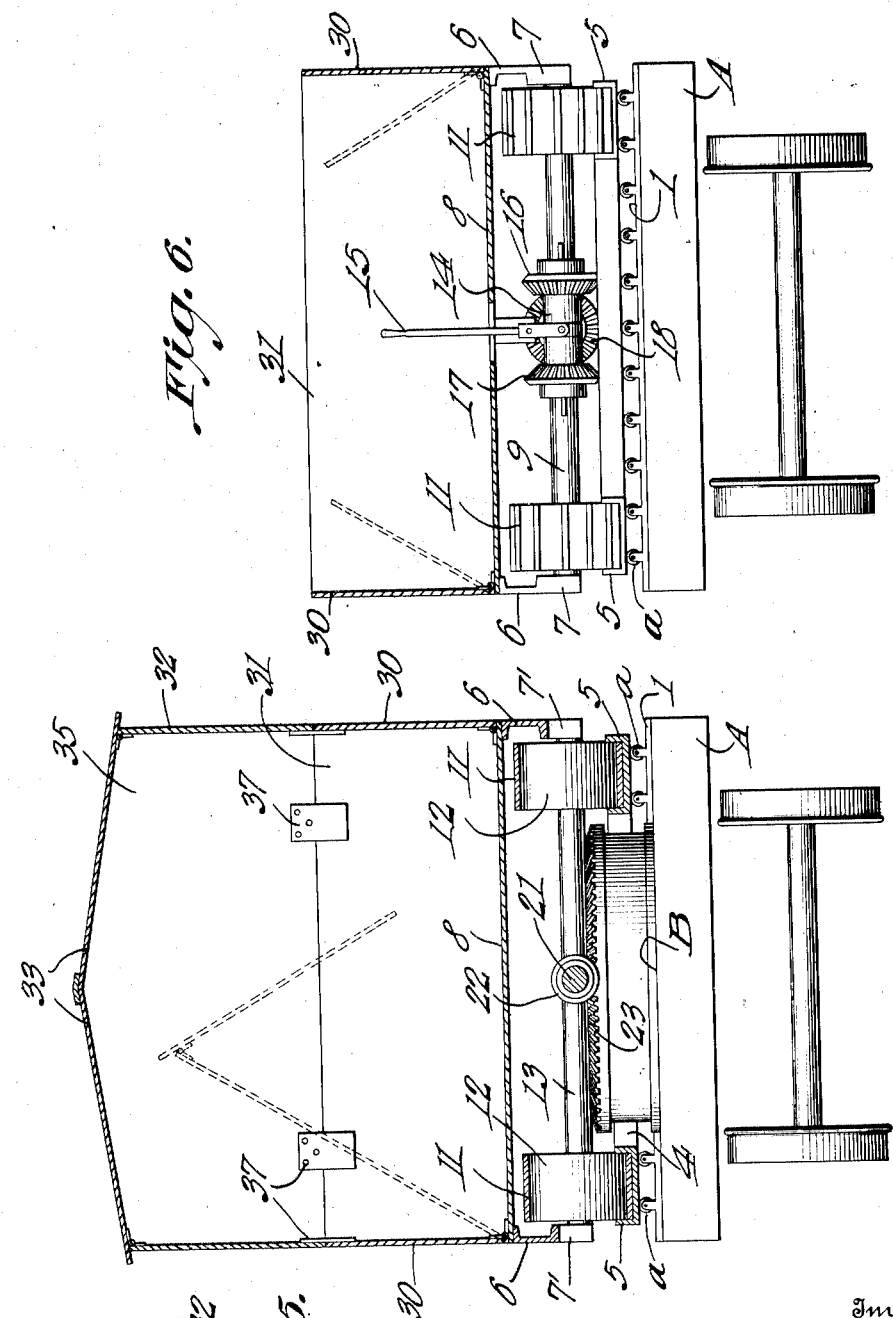

NUMA ULYSSES CARRIÉ, OF NEW ORLEANS, LOUISIANA.

FREIGHT-CAR.

1,373,052.  Specification of Letters Patent.  Patented Mar. 29, 1921.

Application filed December 19, 1919. Serial No. 346,034.

*To all whom it may concern:*

Be it known that I, NUMA ULYSSES CARRIÉ, a citizen of the United States, residing at New Orleans, in the parish of Orleans and State of Louisiana, have invented new and useful Improvements in Freight-Cars, of which the following is a specification.

This invention has relation to certain new and useful improvements in freight cars and comprises a self propelled freight container arranged to be transported on an ordinary freight car.

The main object of my invention is to provide a self propelled freight container arranged to be transported on an ordinary freight car thereby eliminating the necessity of loading and unloading freight.

Another object is to provide a freight container in the form of a vehicle adapted to be sent from the starting point to the transporting car and be unloaded at the point of destination, without the freight having been handled.

Another object of my invention is to provide a self propelled vehicle to be used and serve as a packing case or freight container.

A further object of my invention is to provide a self propelled vehicle arranged to be used as a freight car, including a knock down top so arranged that the vehicle can be used as a flat, covered, or gondola.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modification within the scope of the claims may be resorted to when desired.

In the drawings—Figure 1 is a top view partly in section of a freight carrying vehicle embodying my invention.

Fig. 2 is a side elevation of a flat freight car equipped with my invention.

Fig. 3 is a longitudinal section.

Fig. 4 is a sectional view showing the housing forming sections as folded.

Fig. 5 is a transverse section disclosing the location of the gear segment.

Fig. 6 is a transverse section disclosing the car arranged as a gondola.

In my present invention I employ a vehicle arranged to be transported on a flat freight car A, which near each end has the transverse roller racks 1, 1, and centrally carries the pivot plate 2 containing the pin 3 extending through the rail brace 4 forming part of the swinging tracks 5, 5, which at their ends are arranged to ride on the rollers *a*.

The freight container or car, comprises the base frame 6, having the bearings 7, 7, and the bottom 8, while held in the end bearings 7, 7, are the axles 9, 9', giving support to the tractor wheels 10.

Passing over the end wheels 10, 10, is the endless apron 11, this apron intermediate of its ends passing over the wheels 12, suitably supported on the axle 13.

Fixed to the axle 9 is the shifting collar 14 actuated by means of the lever 15 so that the gears 16 and 17 can be alternately brought into mesh with the driving gear 18 on the shaft 19, driven by means of the motor 20. Suitably connected to the shaft 19 is the shaft 21 having the pinion 22, arranged to be brought into mesh with the gear sector 23 fixed to the floor B, of the car A. The shaft 21, is brought into gear with the main shaft 19 by means of the clutch 24 operated by means of the lever 25.

In shipping case goods it would simply be necessary to drive the vehicle under its own power to the point of loading, place the cases in the vehicle then drive the vehicle under its own power to the railway depot, then on a suitable platform as high as the rollers *a*, turn the track 5, 5, toward the approaching side, in such a manner that the tractor wheels 7 will engage the track rails then start the motor 20 so that the vehicle will move on the track 5, 5, being stopped at the proper point. Throwing the shaft 21 into gear starts the pinion 22, so that the track will be swung over the freight car A. The loaded vehicle and car are now ready to be transported to the point of destination, from whence the vehicle is moved under its own power to the unloading point.

When it is desired to ship goods in a closed vehicle, I employ a set of folding plates 30, 30 forming the lower side sections which are hinged to the bottom 8, the end sections 31, 31, being also hinged to the bottom. When secured in an upright position, the sections 30 and 31 from a so called gondola car or container. When the upper sections 32 are added to which the roof forming sections 33 are added a covered car is provided the end members 31 having the top members 35 fixed thereto. As shown I provide the doors 36, while the upper sections are held to the lower ones by means of the plate 37.

When not in use the sections are folded one on the other as shown in Fig. 4.

Various changes in the form, proportion, and the minor details of construction may be resorted to without departing from the spirit or sacrificing any of the advantages of this invention.

Having thus described my invention, what I claim is—

1. In combination with a freight car, a track carried by said car, a freight container, tractor wheels secured to said container arranged to ride on said track, means for pivotally holding said track, to said car, and means carried by said container for swinging said track, as and for the purpose set forth.

2. The combination with a freight car, a track carried by said car, means for pivotally holding said track, a gear sector carried by said car, a portable freight container including supporting wheels, a motor to rotate said wheels, which are adapted to ride on said track, a suitably supported pinion, and means for connecting said motor to said pinion, said pinion adapted to be brought into mesh with said gear sector.

3. In combination with a flat freight car, of a transverse roller track near each end, of a pivot plate centrally held on said car, a pivot pin in said plate, a brace bar, two swinging rails held on said pin by said brace bar, said rails arranged to swing over said roller tracks, and a tractor freight container the wheels of which are arranged to ride on said rails so that on swinging said rails transverse to said car said tractor can travel on said rails.

4. In combination with a flat freight car, of a transverse roller track near each end, of a pivot plate centrally held on said car, a pivot pin in said plate, a brace bar, two swinging rails held on said pin by said brace bar, said rails arranged to swing over said roller tracks, a gear sector fixed to said car adjacent to said pivot plate, a tractor container the wheels of which are adapted to ride on said rails and a motor driven pinion arranged to mesh with said sector carried by said container.

5. The combination with a vehicle, of a pair of parallel tracks pivoted thereon to swing about a vertical axis and normally disposed longitudinally of the vehicle, a portable container, including traction wheels movable over the tracks, means carried by the container for driving the traction wheels, and means operated by the driving means to swing the tracks at right angles to normal positions.

6. The combination with a railway car, of a pair of tracks mounted thereon and pivoted to the car, intermediate their ends, a wheeled freight container, mounted on the tracks, a toothed segment fixed to the car, and a driven shaft carried by the container and arranged longitudinally thereof, a pinion carried thereby and adapted to traverse the toothed segment whereby to swing the tracks on their pivots.

In testimony whereof I affix my signature.

NUMA ULYSSES CARRIÉ.